(12) United States Patent
Erwin et al.

(10) Patent No.: US 11,905,010 B2
(45) Date of Patent: Feb. 20, 2024

(54) SHORT TAKE OFF AND LANDING AIRCRAFT

(71) Applicants: Chip West Erwin, Brandon, FL (US); Marinus Bernard Bosma, Tipp City, OH (US)

(72) Inventors: Chip West Erwin, Brandon, FL (US); Marinus Bernard Bosma, Tipp City, OH (US)

(\*) Notice: Subject to any disclaimer, the term of this patent is extended or adjusted under 35 U.S.C. 154(b) by 0 days.

(21) Appl. No.: 17/971,455

(22) Filed: Oct. 21, 2022

(65) Prior Publication Data
US 2023/0227154 A1 Jul. 20, 2023

Related U.S. Application Data

(63) Continuation-in-part of application No. 17/463,471, filed on Aug. 31, 2021, now Pat. No. 11,479,340, which is a continuation-in-part of application No. 16/941,420, filed on Jul. 28, 2020, now Pat. No. 11,144,070.

(51) Int. Cl.
| | | |
|---|---|---|
| *B64C 29/00* | (2006.01) | |
| *B64C 19/00* | (2006.01) | |
| *B64D 37/12* | (2006.01) | |
| *B64D 35/02* | (2006.01) | |
| *B64D 27/24* | (2006.01) | |

(52) U.S. Cl.
CPC .......... *B64C 29/0033* (2013.01); *B64C 19/00* (2013.01); *B64D 27/24* (2013.01); *B64D 35/02* (2013.01); *B64D 37/12* (2013.01)

(58) Field of Classification Search
CPC ..... B64C 29/0033; B64C 19/00; B64D 27/24; B64D 35/02; G05D 1/0061; G05D 1/0055
See application file for complete search history.

(56) References Cited

U.S. PATENT DOCUMENTS

| | | | | |
|---|---|---|---|---|
| 6,236,914 | B1 * | 5/2001 | Kaloust | G05D 1/0816 |
| | | | | 701/34.2 |
| 7,676,303 | B2 * | 3/2010 | Hanel | G05D 1/0061 |
| | | | | 701/2 |
| 11,651,694 | B1 * | 5/2023 | Guthrie | B64D 31/06 |
| | | | | 701/3 |

(Continued)

*Primary Examiner* — Joshua J Michener
*Assistant Examiner* — Cindi M Curry
(74) *Attorney, Agent, or Firm* — Cynthia S. Lamon; Lamon Patent Services

(57) ABSTRACT

An aircraft has a pilot compartment and a power source, apparatus adapted to control attitude and direction, apparatus adapted to vary power of the power source, sensors sensing at least altitude, airspeed, power level, and aircraft attitude, a CPU coupled to a data repository, to the sensors and to actuators adapted to change the flight attitude and direction and to vary power, and safe flight envelope data and conditions stored in the data repository defining flight conditions at boundaries of safe and unsafe operation. The CPU monitors the sensors while the aircraft is in operation, determines if flight status is outside the safe flight envelope, and if so, drives appropriate actuators to manipulate the apparats adapted to control flight attitude and direction and/or the apparatus adapted to vary power of the power source in a programmed manner until the flight status is within the safe flight envelope.

18 Claims, 16 Drawing Sheets

(56) References Cited

U.S. PATENT DOCUMENTS

| | | | | |
|---|---|---|---|---|
| 2006/0200278 | A1* | 9/2006 | Feintuch | G05B 9/03 |
| | | | | 701/1 |
| 2018/0134381 | A1* | 5/2018 | Rimanelli | B64D 47/08 |
| 2021/0339882 | A1* | 11/2021 | Ferrier | B64D 27/24 |
| 2021/0380224 | A1* | 12/2021 | Clark | B64C 13/50 |
| 2023/0088506 | A1* | 3/2023 | Wiegman | B64D 45/00 |
| | | | | 701/3 |
| 2023/0089658 | A1* | 3/2023 | Wiegman | B64C 29/0025 |
| | | | | 701/16 |

* cited by examiner

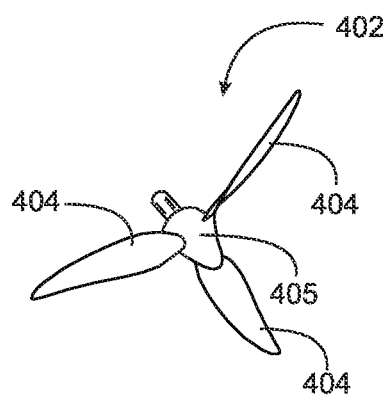 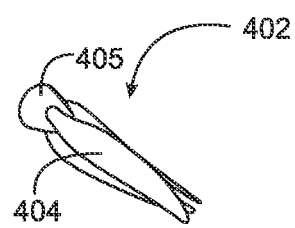
*Fig. 4B*  *Fig. 4C*

SHORT TAKE OFF AND LANDING AIRCRAFT

CROSS REFERENCE TO RELATED APPLICATIONS

The instant application is a Continuation-in-Part of U.S. application Ser. No. 17/463,471 Short Take Off And Landing Aircraft, filed Aug. 3, 2021, which is a Continuation-in-Part of U.S. application Ser. No. 16/941,420, having the title, Short Take Off And Land Aircraft, filed Jul. 28, 2020, which is herein incorporated at least by reference.

BACKGROUND OF THE INVENTION

1. Field of the Invention

The present invention is in the technology area of fixed wing aircraft and pertains more particularly to automated maintenance of a flight envelope in operation.

2. Description of Related Art

The technology of Short Takeoff and Landing (STOL) for fixed wing aircraft is well known in the art, and there are numerous examples in general literature and in patent literature. The length of runway for such aircraft to takeoff and land varies among different designs and models of aircraft, and the technology enabling STOL also varies.

STOL is typically defined as an ability of an aircraft to clear a 50-foot (15 meters) obstacle within 1,500 feet (450 meters) of commencing takeoff or in landing, to stop within 1,500 feet (450 meters) after passing over a 50-foot (15 meters) obstacle.

There are various reasons for providing aircraft capable of STOL, such as reduced cost for runway building and maintenance. In military applications STOL aircraft can use very short runways that are relatively easy to build and maintain in forward positions and in combat situations. Helicopters have long been available to land and takeoff from reduced areas, such as helipads on rooftops, but helicopters have an offsetting disadvantage of being slower in horizontal flight and expensive to operate.

At the time of filing this patent application the planet is in the middle of a pandemic called the Covid-19 virus pandemic. People are at risk in third-world regions where airports with long runways are few, so evacuating effected persons to hospital, for example, is a challenge, and great efforts are also underway to develop vaccines and other effective treatments for Covid-19. When a vaccine is available and manufactured in quantity there will be a pressing need for delivering quantities of vaccine to remote areas to inoculate people. The present state of STOL fixed wing aircraft may be an advantage in delivering vaccine and medications in the pandemic, but what is clearly needed is a STOL fixed wing aircraft that can takeoff and land in much shorter distances that can aircraft in the art at the time of filing this patent application.

It is also well established that fixed wing aircraft operate withing a safe flight envelope, comprising fixed and threshold values for performance characteristics, that vary for every aircraft. What is clearly needed in this instance is a computerized system that monitors performance and status of the aircraft in real time, and automatically operates drive and flight systems to maintain the flight envelope.

BRIEF SUMMARY OF THE INVENTION

An aircraft is provided having a pilot compartment and a power source. The aircraft comprises an apparatus adapted to control flight attitude and direction, an apparatus adapted to vary power of the power source, sensors sensing at least altitude, airspeed, power level, and aircraft attitude, a CPU coupled to a data repository, to the sensors and to actuators adapted to change the flight attitude and direction and to vary power at the power source and safe flight envelope data and conditions stored in the data repository defining flight conditions at boundaries of safe and unsafe operation.

In this embodiment, the CPU monitors the sensors while the aircraft is in operation, determines if flight status is outside the safe flight envelope, and if so, drives appropriate actuators to manipulate the apparatus adapted to control flight attitude and direction and/or the apparatus adapted to vary power of the power source in a programmed manner until the flight status is within the safe flight envelope.

The aircraft, in this embodiment is a Vertical Take Off and Landing (VTOL) aircraft. Alternatively, the aircraft is a fixed wing aircraft, and the apparatus adapted to control flight attitude and direction comprises ailerons, flaps, and a rudder. In this embodiment, the aircraft further comprises distributed electrically driven, individually controllable propellers proximate one or more of ailerons, flaps or rudders, the motors powered by one or more on-board batteries. In another embodiment, the aircraft is a Short Takeoff and Landing (STOL) aircraft having a fuselage with a long axis and a primary engine providing controllable primary forward thrust to propel the aircraft, further comprising a first aileron implemented proximate an end of a first fixed wing extending from the fuselage, a second aileron implemented proximate an end of a second fixed wing, opposite the first fixed wing, a first slot having a length and a width through the first fixed wing proximate the first aileron, the slot length substantially orthogonal to the axis of the fuselage, a second slot having a length and a width through the second fixed wing proximate the second aileron, the slot length substantially orthogonal to the axis of the fuselage, a first reversible electric motor implemented in the first fixed wing driving a first two-blade propeller in the first slot, a second reversible electric motor implemented in the second fixed wing driving a second two-blade propeller in the second slot, and a control mechanism accessible to a user in a cockpit of the aircraft, the control mechanism enabling the user to drive the first and second electric motors in a same rotary direction, to reverse the rotary direction, and to drive the first and second electric motors at a same rpm in either rotary direction. Additionally, slipper pods may be slung under the wings, the wings and the slipper pods housing batteries interconnected and coupled to the electric motors. The slipper pods may be adapted to be jettisoned on command.

The aircraft may include a plurality of slots in linear arrangement along an edge of each aileron, each slot enclosing a two-blade propeller driven by a reversible electric motor, wherein all of the propellers are driven in concert. The aircraft may also include bays implemented in the wings, the bays housing batteries interconnected and coupled to the electric motors. In this embodiment, the two-blade propeller in each slot is adapted to be constrained wholly within the slot when not being driven by the associated electric motor.

A method is provided of maintaining operation of an aircraft having a pilot compartment and a power source within a safe flight envelope, comprising the steps of 1) monitoring sensors sensing at least altitude, airspeed, power level, and aircraft attitude by a CPU coupled to a data repository, to the sensors and to actuators adapted to control apparatus adapted to control flight attitude and direction to change the flight attitude and direction and to vary power at the power source; 2) determining whether flight status is outside a safe flight envelope by comparison of real time sensed values to stored safe flight envelope data and conditions in the data repository defining flight conditions at boundaries of safe and unsafe operation; and if so, driving appropriate actuators to manipulate the apparats adapted to control flight attitude and direction and/or the apparatus adapted to vary power of the power source in a programmed manner until the flight status is within the safe flight envelope.

In one embodiment the method includes a Vertical Take Off and Landing (VTOL) aircraft or a fixed wing aircraft having ailerons, flaps, and a rudder. In this embodiment, the aircraft further comprises distributed electrically driven, individually controllable propellers proximate one or more of ailerons, flaps or rudders, the motors powered by one or more on-board batteries.

One embodiment provides the method including a Short Takeoff and Landing (STOL) aircraft having a fuselage with a long axis and a primary engine providing controllable primary forward thrust to propel the aircraft, further comprising a first aileron implemented proximate an end of a first fixed wing extending from the fuselage, a second aileron implemented proximate an end of a second fixed wing, opposite the first fixed wing, a first slot having a length and a width through the first fixed wing proximate the first aileron, the slot length substantially orthogonal to the axis of the fuselage, a second slot having a length and a width through the second fixed wing proximate the second aileron, the slot length substantially orthogonal to the axis of the fuselage, a first reversible electric motor implemented in the first fixed wing driving a first two-blade propeller in the first slot, a second reversible electric motor implemented in the second fixed wing driving a second two-blade propeller in the second slot, and a control mechanism accessible to a user in a cockpit of the aircraft, the control mechanism enabling the user to drive the first and second electric motors in a same rotary direction, to reverse the rotary direction, and to drive the first and second electric motors at a same rpm in either rotary direction.

The STOL aircraft may further comprise a plurality of slots in linear arrangement along an edge of each aileron, each slot enclosing a two-blade propeller driven by a reversible electric motor, wherein all of the propellers are driven in concert. Additionally, the STOL aircraft may further comprise bays implemented in the wings, the bays housing batteries interconnected and coupled to the electric motors. In this embodiment, the two-blade propeller in each slot is adapted to be constrained wholly within the slot when not being driven by the associated electric motor. Slipper pods may be added to the STOL aircraft slung under the wings, the wings and the slipper pods housing batteries interconnected and coupled to the electric motors. Additionally, the slipper pods may be adapted to be jettisoned on command.

BRIEF DESCRIPTION OF THE SEVERAL VIEWS OF THE DRAWINGS

FIG. 4B is a perspective view of propeller 402, extended.

FIG. 4C is a perspective view of propeller 402, folded.

DETAILED DESCRIPTION OF THE INVENTION

Figure 1:
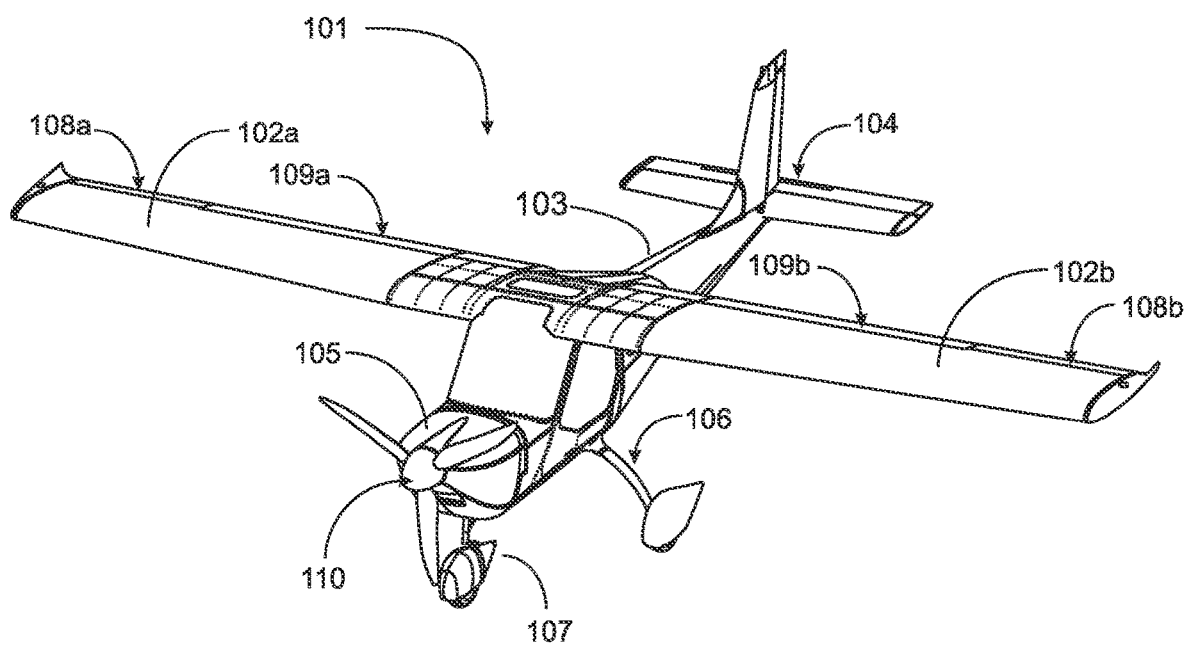
FIG. 1 is a perspective illustration of a STOL fixed-wing aircraft in an embodiment of the present invention.

FIG. 1 is a perspective illustration of a STOL fixed-wing aircraft 101 in an embodiment of the present invention. In this example the aircraft is a fixed wing aircraft with a single engine 105 driving a propeller 110, located at the front of the aircraft. Aircraft 101 has a fuselage 103 a tail section 104 including a rudder, two fixed wings 102a and 102b landing gear 106 including a nose wheel 107, aileron apparatus 108a and 108b, and flap apparatus 109a and 109b. Propeller 110 in some embodiments may be reversible to provide braking on landing, and may be blades adjustable for thrust, as is known in the art.

Aileron apparatus 108a and b are implemented near the outboard ends of wings 102a and 102b. The use of the ailerons is well-known in the art for generating a rolling motion for the aircraft, which may precipitate a banking turn. Aileron control is critical in takeoff and landing, particularly in landing the aircraft. Ailerons usually work in opposition: as the right aileron is deflected upward, the left is deflected downward, and vice versa. In embodiments of the invention aileron apparatus 108a and 108b comprise additional elements enhancing operation of the conventional aileron functions. These elements and operation are described in enabling detail below.

Flap apparatus 109a and 109b implemented in wings 102a and 102b are well-known as apparatus for increasing lift. Flaps extension is particularly important in takeoff and landing as well and is critical in operation of an aircraft intended for short takeoff and landing (STOL). Both the aileron apparatus and the flap apparatus are enhanced in a unique way in some embodiments of the present invention, and detail of enhancements is provided below in enabling fashion.

Figure 2:
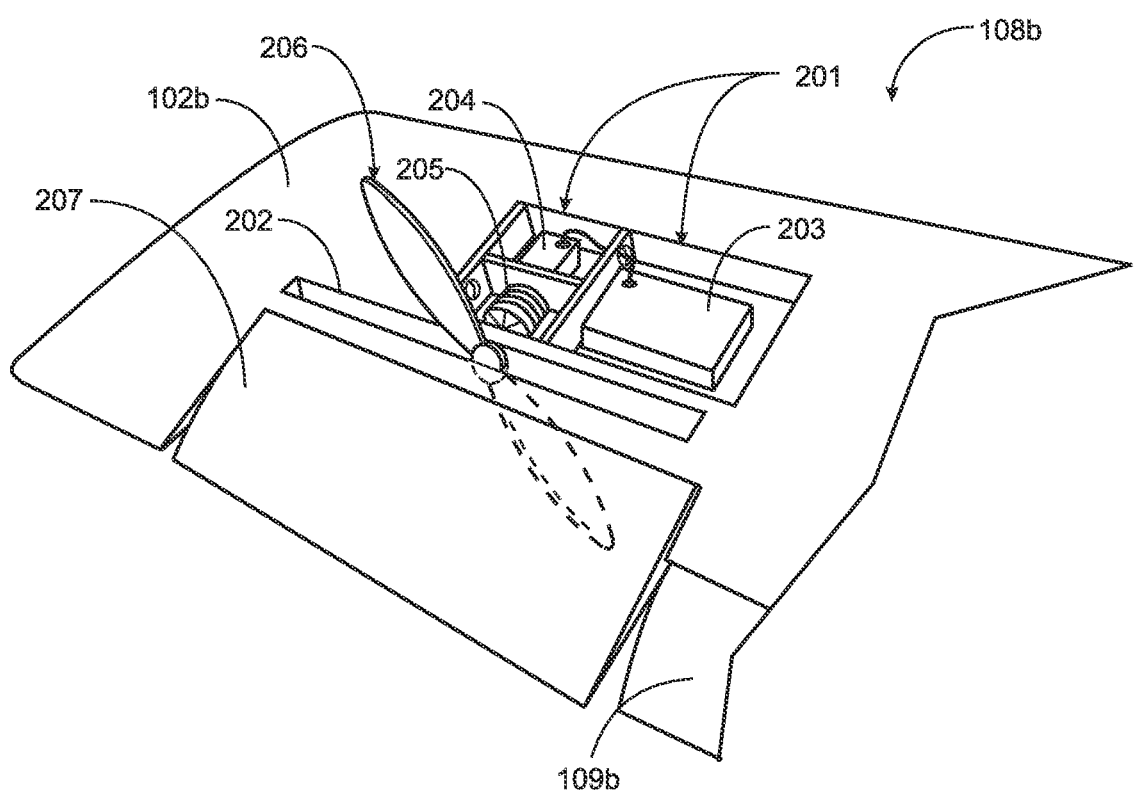
FIG. 2 is a perspective view of an aileron apparatus of the aircraft of FIG. 1 in an embodiment of the invention.

FIG. 2 is a perspective view of aileron apparatus 108b of aircraft 101 in an embodiment of the invention. The overall aileron apparatus comprises several elements and functions not common to conventional aileron apparatus and function. In this example compartments 201 are implemented in wing 102b to house one or more rechargeable batteries 203, a motor controller 204, and an electric motor 205. This motor in one embodiment is a brushless DC motor which has an advantage of being controllable to start and stop the motor in particular positions, making it feasible to stop the motor with blades of a two-blade propeller enclosed in a slot in a wing or a flap portion. Brushless DC motors are not, however, required in embodiments of the invention, and indeed, in some embodiments motors of other power sources may also be used. A slot 202 of a length and width to accommodate a propeller 206 is implemented through wing 102b. In this example propeller 206 is a propeller having two blades extending in opposite directions, such that the propeller, stopped in a horizontal aspect, may be enclosed in slot 202. In FIG. 2 the propeller is shown in a rotary aspect that blades of the propeller are extending from the slot. Propeller 206 may be in one embodiment a propeller with a single blade, counterbalanced to avoid excessive vibration. The propeller is driven by motor 205 on a drive shaft passing through a sidewall of slot 202. Propeller 206, spinning, may provide airflow over aileron 207 at any condition of airspeed of the aircraft, even with the aircraft at a standstill, and therefor provide force to affect attitude of the aircraft. The propeller provides airflow over and under the aileron.

The electric motor, if a brushless DC motor, is controllable to stop propeller 206 with the propeller horizontal and contained wholly within slot 202, such that when not being used the propeller offers no resistance to flight of aircraft 101.

As is known in the art, aileron 207 is used for generating a rolling motion for the aircraft, which may precipitate a banking turn. Typically, when one aileron is moved downward the opposite aileron is moved upward. For a purpose of the present invention which is to takeoff and land in a bare minimum distance, reducing the velocity of the aircraft to a bare minimum just before touchdown is a requirement. At some point in the reduction of velocity, before landing velocity is attained, effect of the ailerons is lost, as the air velocity over the ailerons is too slow to provide sufficient cantilever force on the wing to provide control.

In a landing protocol in an embodiment of the present invention a slot cover (not shown in FIG. 2) over slot 202 is opened and motor controller 204 is commanded to activate motor 205 to drive propeller 206 at a time in the landing process that the velocity of the aircraft has not yet reduced to the velocity where control by the ailerons is lost. Slot covers are shown and described below with reference to FIG. 4. Brushless motor 205 driving propeller 206 provides sufficient air volume and velocity over the aileron so force and torque are adequate to maintain control all the way to touchdown. For example, in one circumstance the landing velocity may be 20 knots, while aileron control may be lost at forty knots. Use of auxiliary propeller 206 forcing air directly over aileron 108b may provide an apparent airspeed of more than forty knots over the aileron 108b while the actual airspeed of the airplane is reduced to 20 knots at landing.

FIG. 2 illustrates apparatus and operation for aileron 108b, but it is to be understood that a second auxiliary propeller system like that described with reference to FIG. 2 is also implemented at the outboard end of wing 102a for aileron 108a. Both ailerons are enhanced in takeoff and landing with auxiliary propellers and are controlled in tandem as is described in enabling detail below.

Figure 3:
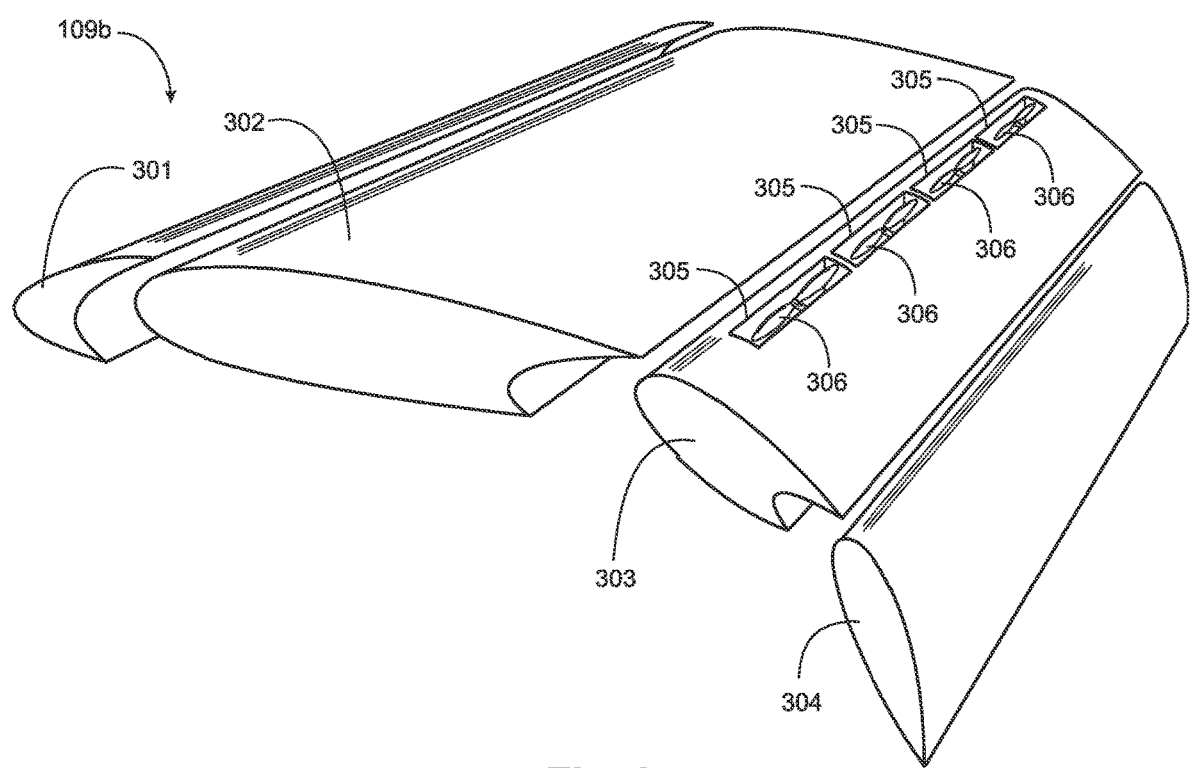
FIG. 3 is a perspective view of a flap system shown extended from a wing of the aircraft of FIG. 1 in an embodiment of the invention.

FIG. 3 is a perspective view of flap system 109b, shown extended from wing 102b of aircraft 101. A flap system in a fixed wing aircraft, if used, is mirrored on each wing on each side, as it is desired to provide even lift on both wings to avoid attitude unbalance. A base portion 301 interfaces with a main portion 302, which interfaces with an enhanced portion 303, which interfaces with a final portion 304. The portions are shown somewhat more separated than in use for purpose of clear illustration. The portions are connected in the operative system and follow a track (not shown) as is known in the art to be extended and retracted. The track is curved to produce the curvature of the connected flap system of main portion 302 and enhanced portion 303 as they extend and retract by a translating system.

The purpose of the extending and retracting flaps is to increase and decrease the overall lift of the wing. As is well-known in the art, as velocity of the aircraft decreases in a landing operation, lift decreases because the velocity of air over the wing also decreases, and at some point, without some means of increasing lift the aircraft will stall. The flaps are the means of increasing lift as velocity drops. Extending the flaps increases wing surface area and curvature, and lift may be controlled up to a point by flap extension and retraction.

There is a limit to additional lift provided by flap extension in conventional systems. At some point in reducing airspeed, lift fails to support the weight of the aircraft, and airspeed may not be reduced further without the aircraft falling. This limitation is critical in landing, as the speed at touchdown together with the mass of the aircraft, cargo and fuel and the efficacy of the braking system determines the length of runway necessary to bring the aircraft to a stop. The idea is to land at the lowest airspeed that may be attained down to the time of touchdown.

Returning to FIG. 3, in an embodiment of the invention portion 303 of the flap system has a plurality of slots 305, each having a propeller 306 driven by an electric motor in a compartment (not shown) in the flap portion also holding a rechargeable battery for driving the propeller when needed. These compartments and the elements within are similar to compartments 201 in FIG. 2. The motors may be any one of many sorts, but in one embodiment brushless DC electric motors are preferred, as these are controllable to stop the two-blade propellers withing the slots.

At some point in extending the flaps in an embodiment of the invention slots 305 are exposed from wing 102b, and coverings of the slots (not shown) may be opened. When the slots are exposed and opened the propellers may be engaged. In this example the propellers are adapted in form and direction of rotation to produce increased volume and velocity of air over the flap portions, particularly portions 303 and 304 in this example. In embodiments of the invention wherein additional propellers are used in slots to increase lift, the propellers are controlled, when used, to spin in opposite directions on each wing, to balance torque production on the aircraft by direction of rotation. Overall lift is increased and may be maintained greater than overall weight of the aircraft to a substantially lower airspeed than in the conventional art. Slot covers are described below with reference to FIG. 4.

In FIG. 3 it may appear that the propellers in operation may not extend entirely through the flap portion and may not therefore provide airflow under the flap portion. This is of small consequence, however, because it is only airflow and volume over the flap portion that is needed to provide additional lift. The propellers need not be mounted centrally in the flap portion but may be positioned more toward the upper region of the slot. In operation the propellers will extend above the slot, just as is shown for propeller 206 in FIG. 2.

Figure 4A:
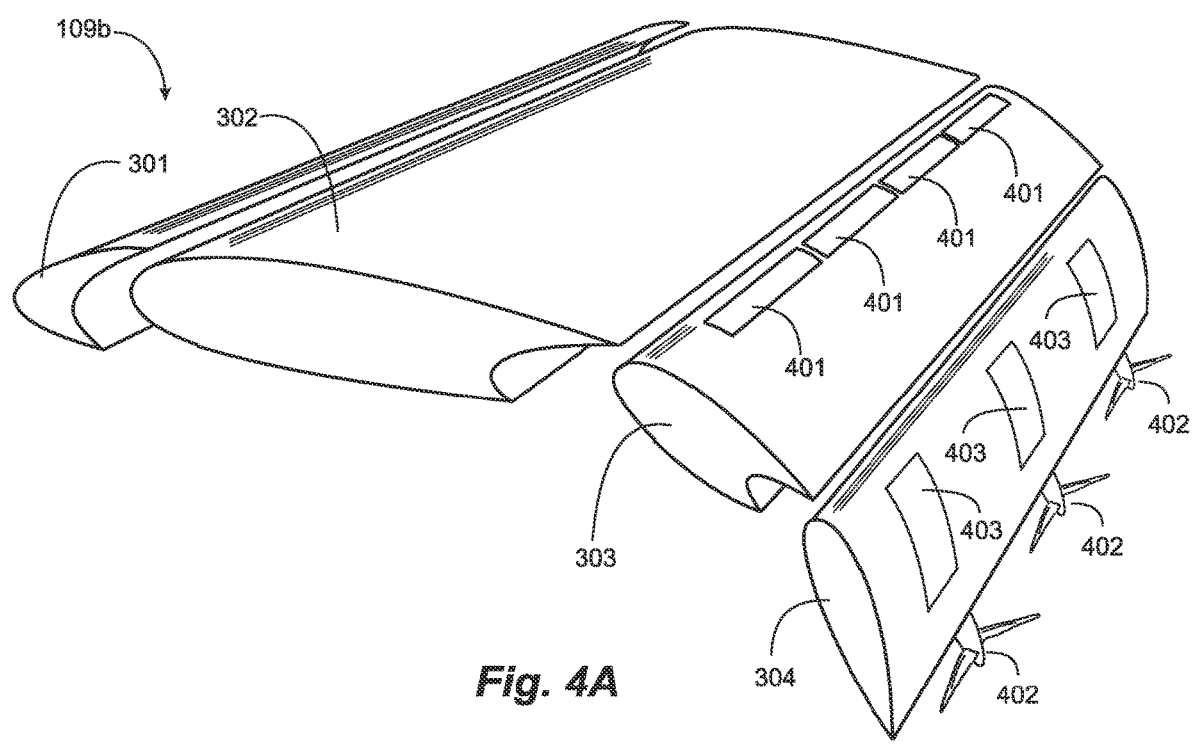
FIG. 4A is a perspective view of a flap system in an alternative embodiment of the invention.

FIG. 4A illustrates a flap system 109b, with a base portion 301, a main portion 302 which interfaces with an enhanced portion 303 with optional propeller covers 401 connected to a final portion 304 in an alternative embodiment of the invention, wherein batteries, electric motors and propellers are incorporated into a final extended portion 304 of the flap system of FIG. 3. In this embodiment there are compartments 403 implemented into portion 304 of the flap system, three in this example, and batteries and electric motors are enclosed much as is shown in FIG. 2 for the aileron embodiment. The skilled person will understand that the assembly and architecture may be different for the embodiment of FIG. 4A, but the components and functions are essentially the same.

In the embodiment of FIG. 4A the battery and motor compartments are shown closed by cover panels, which may be removable to facilitate maintenance and service. Shafts from motors in the compartments are directed outward from the extreme trailing edge of the flap portion, as shown, driving foldable propellers 402, which in one embodiment have three props, two of which may be seen in FIG. 4A, and one of which is hidden because of the angle of the view. The direction of the shafts is along a line bisecting the length of the flap portion. Propellers 402 thus provide thrust in whatever direction the flap is directed. As shown in FIG. 4A, with the flaps fully extended, portion 304 points primarily downward, so thrust provided by propellers 402 is primarily upward, depending on the rotational direction of the propellers.

Also, in FIG. 4A slots in flap portion 303, described above in enabling detail with reference to FIG. 3, are covered with slot covers 401. In embodiments of the invention slots for propellers need to be covered when the propellers are not in use because air leakage through the slots may affect lift and may produce drag. In various embodiments remotely operable covers are provided that may be opened and closed as needed. In one embodiment a cover may be operable on a track to one side of a slot and may be manipulated by a solenoid operated cylinder, or a hydraulic cylinder. There are a variety of ways that slot covers may be implements and operated.

Propellers 402 are folding propellers that, in one embodiment extend, as shown in FIG. 4A, by centripetal force when the motor spins. In another embodiment there are remotely operable mechanisms in the propeller hub to extend and fold the propellers, and the functionality is controlled by commands in a control system described more fully below. In some embodiments the pitch of the propellers is also remotely controllable.

FIG. 4B illustrates one propeller 402 with props 404 powered by engine 405 fully extended. FIG. 4C illustrates one propeller 402 fully folded. In the folded aspect the propellers have very little drag on the aircraft, and with the flaps retracted, the direction of the folded propellers is essentially directly to the rear of the wing.

On takeoff, typically the flaps will be fully extended, and propellers 402 will provide both forward thrust and lift. The action of propellers 402 draws air over the flap sections which also adds to lift. On landing, as flaps are retracted, propellers 402 may be reversed for braking thrust. Given the descriptions above of different embodiments of the invention, there may be a substantial plurality of auxiliary propellers, such as propellers 206, 306, 402, and primary propeller 110. In takeoff and landing procedures any and all of these propellers may be used to provide increased lift or braking as needed by circumstance, and to accomplish these ends, propellers may be reversed in direction, adjustable blades may be used, and speed rpm may be controlled to control thrust as needed.

It will be apparent to the skilled person that apparatus and function enabled in variations of the invention may or may not all be implemented in specific embodiments. That is, aileron systems supplemented with propellers for increasing air volume and speed over the ailerons may be used without enhanced flap systems as described. Enhanced flap systems may be used without the enhanced aileron systems. Apparatus and function described in this specification may be used in aircraft of widely different types and may be used in different combinations to satisfy different circumstances.

Figure 5:
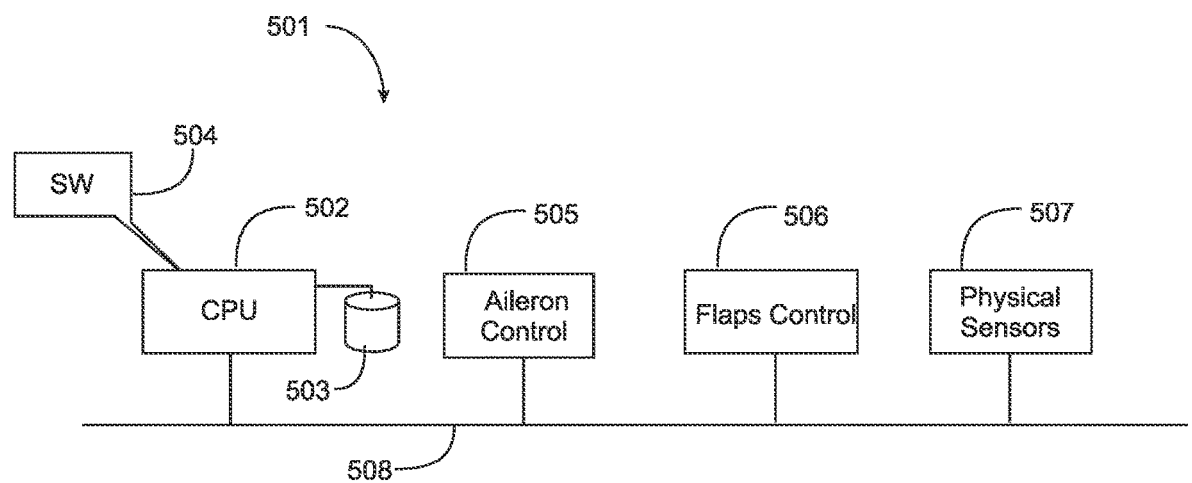
FIG. 5 illustrates a control system in the aircraft of FIG. 1 in an embodiment of the invention.

FIG. 5 illustrates a control system in aircraft 101 adapted to facilitate control of the elements of the system to perform as a hyper-STOL system, capable of takeoff and landing from, for example, a rooftop or a landing pad of the size of a tennis court.

Control system 501 in this example has a central processing unit (CPU) 502 connected to a local bus 508, which enables the CPU to communicate with other digital devices in the control system. Bus 508 also comprises conductors providing power to the digital devices.

CPU 502 may be one of many well-known digital processors in the art or may be a micro-processor in some embodiments. CPU 502 executes software (SW) 504 in this example and is coupled to a data repository 503 which may store one or more code sequences that may be called and executed in different circumstances in control, and may also store data values that are called in control sequences.

Aileron control 505 in FIG. 5 represents remotely operable elements that are dedicated to functions regarding the left and right aileron systems 108a and 108b. Among elements involved in aileron control, there are mechanical apparatus that may be commanded by CPU 402 to open and close covers over slots 202. Once slots 202 are open, motor controllers 204 may be commanded by CPU 502 to operate motors 205 to drive propellers 206 in either rotary direction. In some embodiments the propellers may be of a sort that the aspect of the blades may be changed to change the direction and degree of thrust. In some embodiments the angle of flaps 207 may also be controlled under specific circumstances.

Flaps control 506 represents remotely operable elements that are dedicated to functions regarding the left and right flap systems 109a and 109b. Among elements involved in flap control, there are mechanical apparatus that may be commanded by CPU 502 to open and close covers over slots 305. Once slots 305 are open, motor controllers 204 may be commanded by CPU 502 to operate motors to drive propellers 306 in either rotary direction. In some embodiments the propellers may be of a sort that the aspect of the blades may be changed to change the direction and degree of thrust. In some embodiments the extension and retraction of the flaps may also be controlled, at least in part, by CPU 502.

Physical sensors 507 represents a group of sensors that report important real-time data to CPU 502 for use in control functions. One of the more important data points is airspeed. One or more airspeed sensors are implemented on a surface of the aircraft to report real-time airspeed. Other sensors determine attitude of the aircraft, including roll attitude and attitude of the fuselage. There may be other sensors involved as well. In processes in embodiments of the present invention CPU 502 executes one or more code sequences from data repository 503, and commands physical elements for control of the aircraft according to data provided by sensors.

Although control is described here as mostly automated, manual control of elements in embodiments of the invention is not precluded. Control may in some implementations be entirely automatic, in some entirely automated, and in others a mixture with some functions automated and some accomplished manually.

Referring again to FIG. 1, primary forward propulsion of aircraft 101 is provided by engine 105, which may be an internal combustion engine. In some circumstances functions of engine 105 may be controlled, at least in part, under specific circumstances by CPU 502. Brakes of the aircraft may also, in some circumstances, be controlled, at least in part, by CPU 502.

Figure 6:
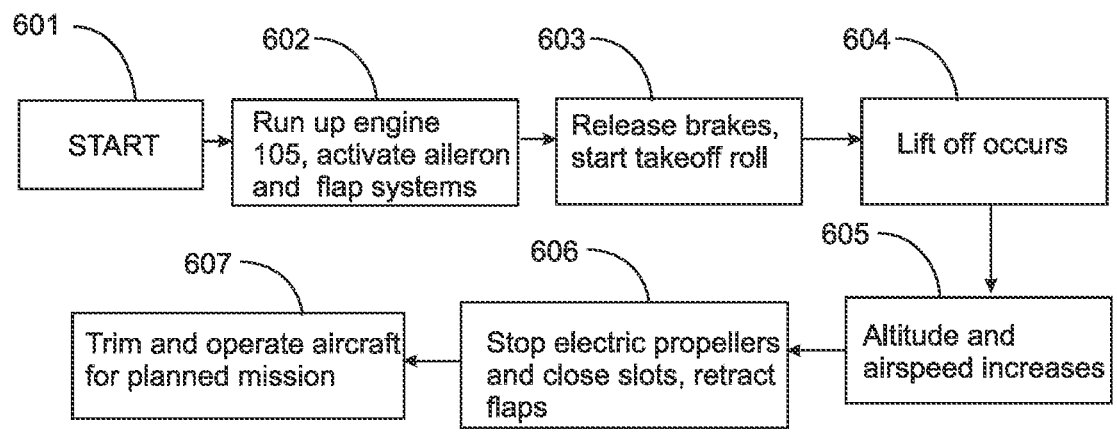
FIG. 6 is a flow diagram representing a takeoff process in one embodiment of the invention.

FIG. 6 is a flow diagram representing a takeoff process in one embodiment of the invention. At step 601 the aircraft may be positioned at a beginning end of a takeoff roll, which for purpose of description, may be a relatively small rooftop, or a small flat area, of the size perhaps of a tennis court. At step 601 the brakes of the aircraft are engaged.

At step 602 power to primary engine 105 is applied to maximum and propeller attitude is set, if adjustable to maximum thrust. Also, at step 602 while the aircraft is still stationary, slots 202 are opened, and propellers 206 are driven to provide additional forward thrust as well as aileron control. Further, the flaps are extended for maximum lift, slots 305 are opened, and propellers 306 are activated and driven to provide maximum lift for the aircraft as well as additional forward thrust in addition to that provided by primary engine 105. Propellers 402 may also be engaged for additional lift and forward thrust for a takeoff roll. At step 603 the brakes are released, and the aircraft starts a takeoff roll.

At step 604 liftoff occurs. With the added lift provided by the enhanced flap systems and added thrust provided by all the propellers of the enhanced flap system and the aileron systems the takeoff roll is reduced to a bare minimum. At step 605 altitude and airspeed increase. The electric propellers of the enhanced aileron system and the enhanced flap system may continue to be used for a time to attain desired altitude and airspeed. At step 606 the electric propellers are stopped slots are closed and control reverts to conventional manual and computerized control. At step 607 the aircraft is operated to complete a planned mission up to a landing process.

Figure 7:
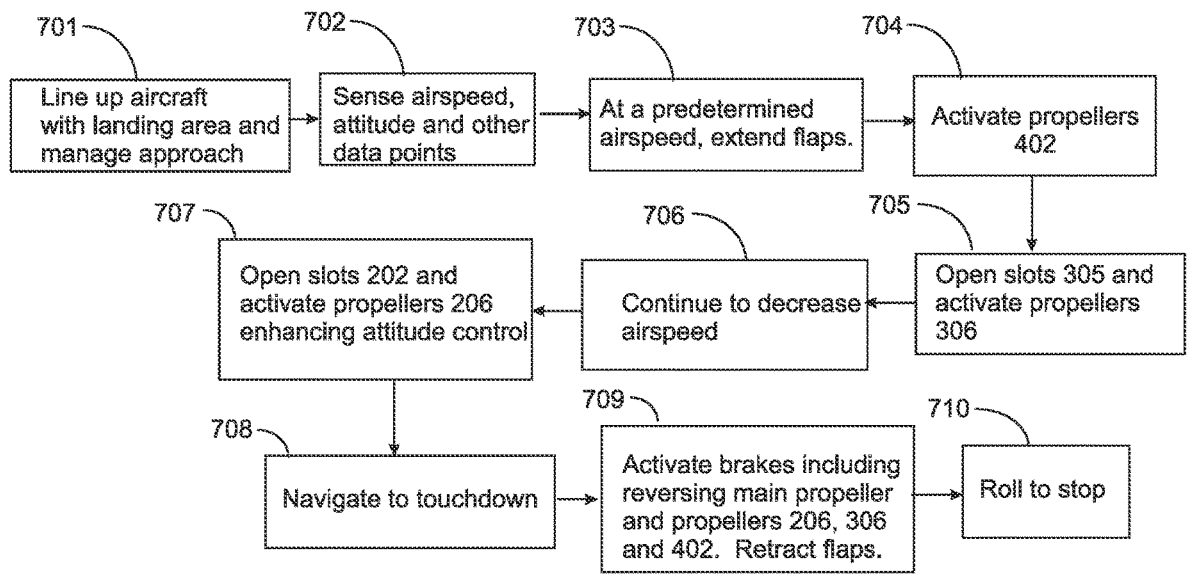
FIG. 7 is a flow diagram illustrating a landing process in an embodiment of the invention.

FIG. 7 is a flow diagram illustrating a landing process in an embodiment of the invention. At step 701 the aircraft is lined up with a landing area which may be, as in the case of the takeoff process, a very small area. At step 702 the system described with reference to FIG. 5 continues to monitor airspeed, attitude, and other aircraft parameters. At step 703, realizing a determined airspeed for the existing conditions, the system extends the flaps for enhanced lift. At step 704 propellers 402 are activated. At step 705 slots 305 are opened and propellers 306 are activated to enhance lift further.

At another point during landing approach, at step 706, airspeed continues to decrease. At a second airspeed at which it is determined that aileron control will be lost, at step 707 slots 202 are opened and propellers 206 are activated providing enhanced control for the ailerons below an airspeed where control would conventionally be lost. At step 708 the aircraft continues to touchdown with both enhanced lift and enhanced control, enabling the airspeed to be reduced to a minimum value at the point of touchdown. Minimum speed at point o touchdown is an important aspect of the present invention, because landing roll is a function of that speed, the mass of the aircraft, and the braking that may be applicable.

At step 709 the brake systems of the aircraft are activated, which may include reversing the main propeller, and one or both sets of propellers 206 and 306, which may be reversed in rotation or blade pitch to provide further reverse thrust. At step 710 the aircraft rolls to a stop in a minimum landing roll. The length of the landing roll may be minimized by the minimum landing airspeed made possible by the increased lift provided by the enhanced flap system.

In the embodiments described above the example is a fixed wing, single engine aircraft. In some embodiments elements and functions of the invention may be applied to aircraft with multiple engines, and other aircraft. In many embodiments the aircraft may be pilotless, such as many unmanned aerial vehicles (UAVs).

Innovative Application of Distributed Electrical Propulsion (DEP)

In conventional systems DEP comprises multiple electric motors and propellers mounted on the leading edge of an aircraft wing. There are currently many commercial projects leveraging different configurations of DEP. Yet DEP has at least two major shortcomings:

1. The E in DEP is for Electric, and electric power is far from ready as a viable propulsion system in any aircraft much larger than a light sport aircraft or self-launching glider. Energy density of batteries is the limiting factor and needs to improve by a minimum of three times before electric power becomes viable for aircraft propulsion. Most DEP applications are 100% battery-powered resulting in short endurance and limited range. A hybrid power system is required but adds considerably to complexity and weight leaving marginal useful load and still only fractions of the endurance and range of conventional aviation fuel systems. Furthermore, DEP on most aircraft must always be engaged or the additional drag of exposed motors and propellers would be significant, even making the aircraft nearly unairworthy.

2. A critical element in aircraft design is clean airflow over flying surfaces. Laminar flow is the holy grail for aeronautical engineers. Keeping the airflow attached to the wing as long as possible results in the highest co-efficient of lift (C/L) and the greatest aeronautical efficiency.

A principle of DEP is that multiple propellers in front of the wing increase the airflow over the wing, resulting in increased lift. This is true, but the airflow is typically so disturbed on both top and bottom surfaces of the wing that the benefits of greater lift are marginalized. The subject aircrafts' performance increase may be just attributed to added thrust as it is to any increase in C/L The present inventors have developed a more efficient and effective use of DEP wherein DEP is employed in an aircraft for only short durations on takeoff and landing and to enhance slow speed roll control. The inventors term the enhanced system DEP on Demand, or DEPOD. In the unique DEPOD system the motor is installed in the wing interior with the propeller stowed in a through slot in the wing when not the propeller is not active, eliminating drag when the propeller is not in use.

Figure 8A:
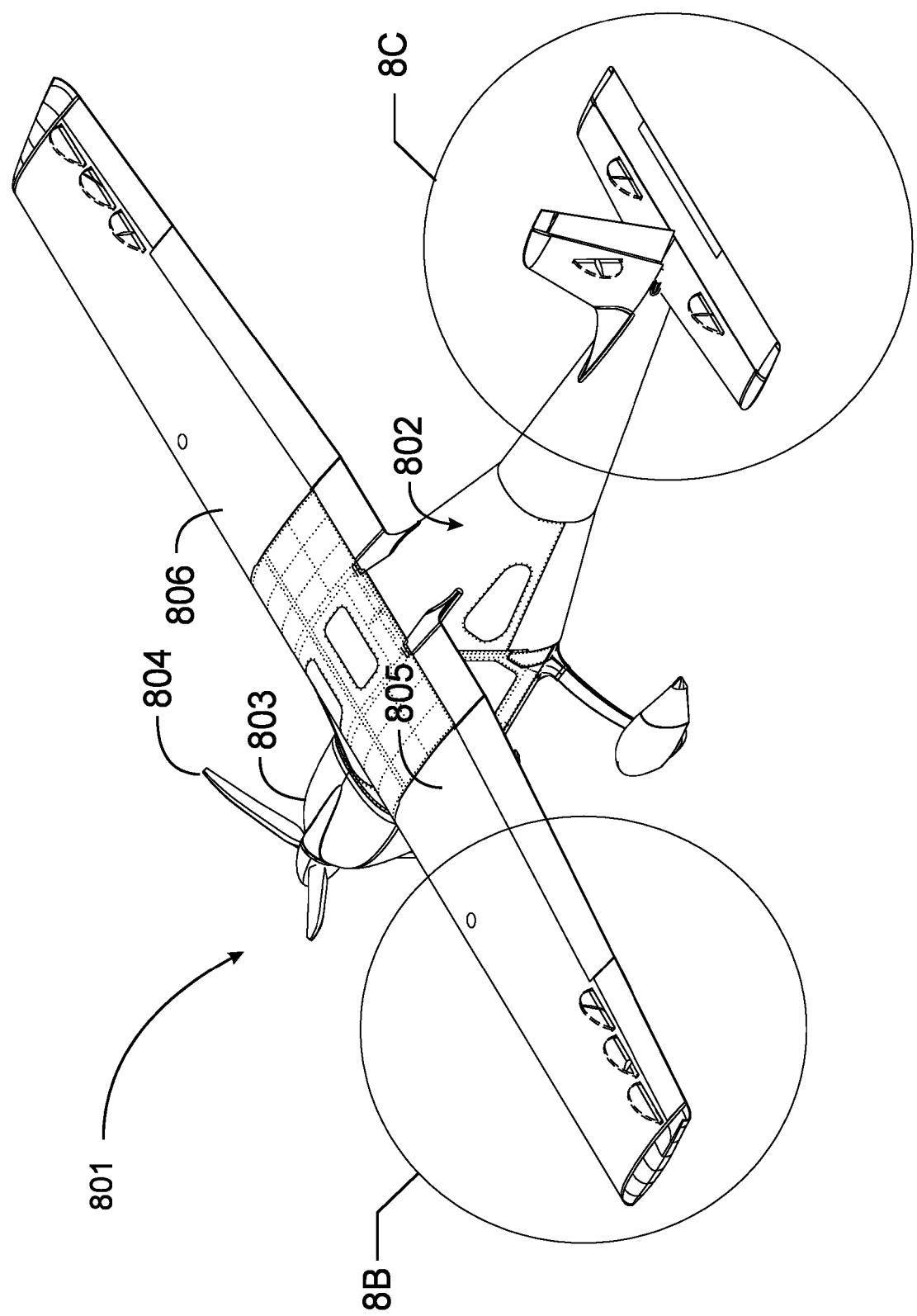
FIG. 8A illustrates a STOL fixed-wing aircraft in an alternative embodiment of the invention.

In another aspect of the invention a fixed-wing STOL aircraft is provided with features that provide exceptional slow speed control. FIG. 8A illustrates the enhanced-control aircraft in one embodiment, which has a fuselage 802, a single engine 803, in this example, driving a propeller 804. Engine 803 in one embodiment consumes auto gas which has about 10 times the energy density of battery power, resulting in endurance measured in hours rather than minutes.

Figure 8B:
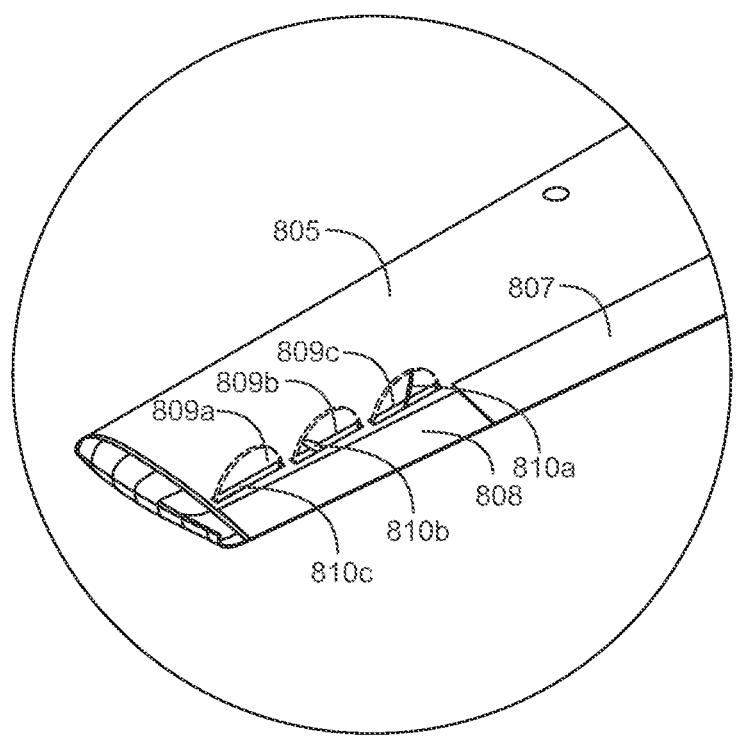
FIG. 8B illustrates an enhanced aileron on a wing of the aircraft of FIG. 8A.

Two fixed wings 805 and 806 extend from the fuselage in this embodiment. Each wing has an aileron at an outboard end, one of which, aileron 808, is indicated in detail 8B, which is illustrated in more detail in FIG. 8B. Wing 806 has a mirror image aileron also at an outboard end, but the inventor believes that description of aileron 808 sufficiently describes both. Aileron 808 as in most aircraft is hydraulically activated and being raised or lowered induces an upward or downward force on the outboard end of wing 805, for a purpose of control of aircraft roll about a long the axis of the fuselage. Control is from input mechanisms in a cockpit of the aircraft, which operate the ailerons such that when one is raised, the other is lowered by a same amount. In conjunction with wing lift the roll of the aircraft by manipulating the ailerons causes the aircraft to turn left or right, depending on the required direction of roll.

Returning again to FIG. 8B, in this implementation, three slots 809a, 809b and 809c are provided through wing 805, along a front edge of aileron 808; and dual blade propellers 810a, 810b and 810c are disposed in the through slots, much in the manner as described above for other embodiments. Propellers 810a, 810b and 810c in this example are driven by electric motors encased within wing 805; the electric motors are controlled by input mechanisms in the cockpit.

In one embodiment, the arrangement of the electric motor, propeller and battery for each aileron may be substantially as shown in FIG. 2, which shows one battery bay or compartment 201 holding a battery 203, and a propeller 206 in a slot 202 in the wing, the slot and propeller proximate the aileron 207. In other embodiments there may be more than one battery bay and battery, and batteries may be interconnected both in parallel and in series.

In one embodiment, the pack is a six-cell LIPO pack with a voltage range of 3.0 to 4.2 volts. Each pack has 5500 mAh, and six packs per motor are used. The packs in one embodiment are wired two in series and three parallel. This arrangement results in an operating voltage range from 36 to 50.4 volts. In this example, each pack weighs only 832 g. Six packs total 5 kg or 10.8 lb. With this low weight, the battery cells may be mounted nearly anywhere. Close to the motor may be preferable to minimize battery cable weight and voltage drop. The controller and related electronics all weigh under half a lb, which is insignificant.

Airflow provided by propellers 810a, 810b and 810c is directed over aileron 808, and imparts upward or downward force depending on the attitude of the aileron and rotational speed of the propellers. This force is entirely independent of velocity of the aircraft, and the induced force may be applied with the aircraft at a standstill, at a low forward speed or at a higher forward speed.

Propellers 810a, 810b and 810c each have two blades, and when not powered are oriented in the slots, to ensure that no portion of the propeller extends out of the slot. This is desirable so that unwanted drag is not exerted on the wing of the aircraft when the propellers are not in use. In one embodiment, the electric motors driving the propellers are stepper-type motors which may be controlled, to stop at selected positions (steps). In another embodiment, the propellers may have magnets at an outboard end of each blade, or elsewhere on the blades, which magnets interact with magnets in the slots, so that when a propeller is not powered, and freewheels, the magnets will interact and the propeller will be constrained to lie horizontally in the slot. In one embodiment, the slots may have extendable/retractable covers so that the slots may also be closed when the propellers are not in use, further reducing drag.

Figure 8C:
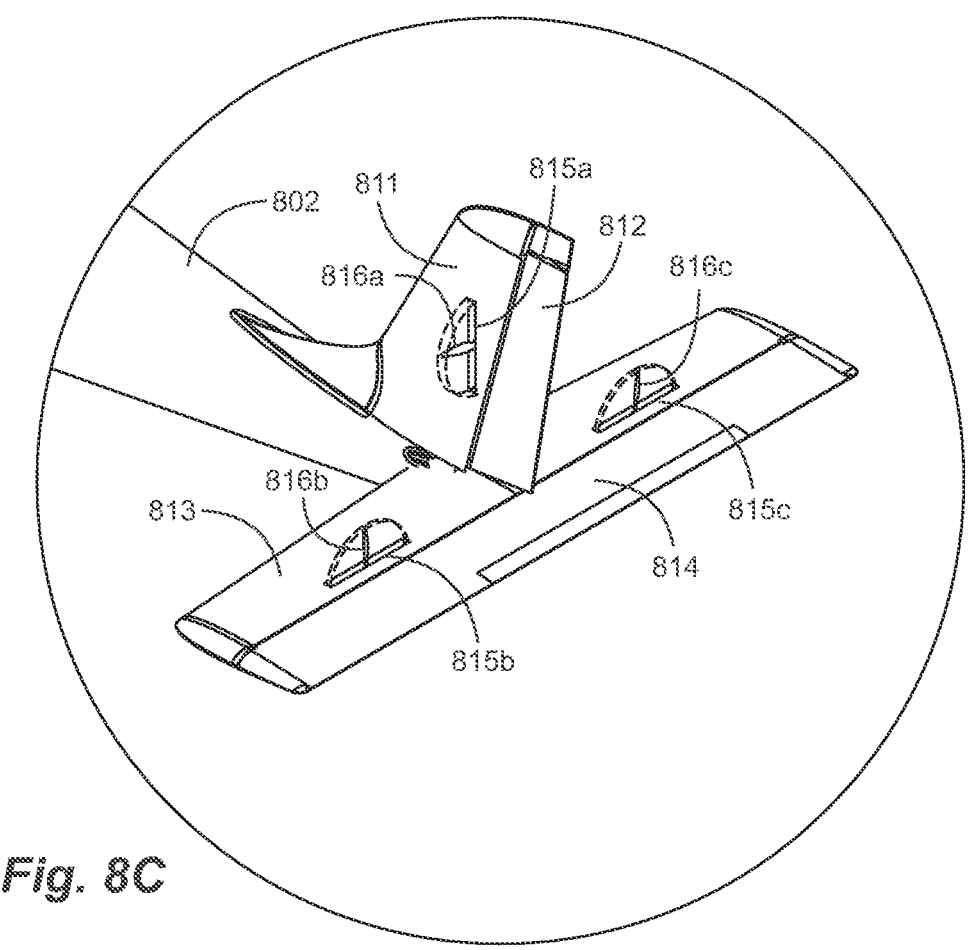
FIG. 8C illustrates a tail section of the aircraft of FIG. 8A.

In yet another embodiment of the invention, DEPOD features are also incorporated into elements of a tail section indicated as detail 8C, which is illustrated in more detail in FIG. 8C. The skilled person will understand that FIGS. 8A, 8B and 8C and accompanying description describe specific examples, which may vary considerably in other embodiments.

FIG. 8C illustrates a tail section of the aircraft of FIG. 8A in the alternative embodiment. The tail section has a vertical stabilizer 811 and an operable rudder 812, typically hydraulically activated and controlled by input mechanisms in the cockpit. Operation of the rudder in forward flight induces a force to move the tail of the aircraft left or right, relative to the longitudinal axis of the fuselage.

In this alternative embodiment a vertical slot 815a is implemented through vertical stabilizer 811, and a propeller 816a is disposed in the slot, driven by an electric motor, not show, that is housed in the vertical stabilizer, along with one or more battery bays. The battery arrangements and interconnections may be the same as described for above for the bays and batteries associated with the ailerons.

In this embodiment slots 815b and 815c are implemented through horizontal stabilizer 813, with propellers 816b and 816c in the slots, driven by electric motors in the horizontal stabilizer (not shown) powered by batteries in bays, also not shown. Propellers 816b and 816c provide enhanced airflow over elevator 814, which is raised and lowered by mechanisms in the cockpit. In some embodiments there may be separate elevators, one on each side of the horizontal stabilizer. The propellers associated with the rudder and the elevators provide significantly enhanced control over the aircraft at low speed.

In the embodiment utilizing DEPOD just at the wing-tip ailerons, the two electric motors are used for only short durations for the three purposes:
1. Takeoff: Takeoff thrust is doubled, which results in a 50-foot takeoff and doubles the climb rate to clear any obstacles and reach 1,000-foot cruising altitude.
2. Blown Ailerons: The motors are installed directly in front of the ailerons. Increased airflow over the ailerons enables full roll-control at approach speeds 'behind the power curve,' which can be a dangerous speed due to the 'aileron reversal' phenomenon.
3. Reverse Thrust: Electric motors are easily reversable to triple stopping power and remain within a very limited landing space, such as, for example, a helipad. Using DEP for only a few seconds per mission means only a few pounds of battery is required. The engine recharges the batteries fully in cruise, and the aircraft's payload is not compromised.

The DEPOD design contributes to extreme short takeoff and landing performance in three ways:
1. Takeoff Thrust: The motors' combined thrust is 140 lb., which increases the total thrust of the aircraft by nearly 40%. This results in the aircraft attaining takeoff speed significantly quicker, which shortens takeoff distance considerably and makes climbing over obstacles much shorter and faster.
2. Roll Control: Naturally, aircraft will takeoff and land in shorter distances if the minimum flying speed is reduced, simple physics. However, besides the stall speed, a limiting factor is low speed control authority. Less airflow over the wing is also less airflow over the ailerons. Furthermore, the airflow at high angles of attack has greater separation from the wing/aileron surface resulting in less roll control authority. The physics:
    a. The aircraft must accelerate to greater speeds before rotating to ensure flight control, particularly in gusty and turbulent conditions. This means longer takeoff distances, of course. DEPOD thrust over the ailerons enhances roll control, mitigating this constraint.

b. An aircraft will land shorter if its landing speed is lower. There is less inertia to dispel. But it is not a safe practice to approach to land close to the stall speed of an aircraft. General practice is to approach at 10 to 20 percent above the stall speed, depending on conditions. And as kinetic energy is a squared function, this extra speed translates to longer landing distances. One of the main reasons for this extra speed is to avoid loss of control which, at low altitudes, may not be recoverable. One such phenomena is 'reversed ailerons' where a response to an asymmetric gust for example, with aileron input can increase the angle of attack on one wing above the critical angle of attack, resulting in a stall/spin. With DEP set at only 20 percent power, the aircraft has roll authority at all airspeeds. Approach speed is safely reduced, resulting in shorter landing distance.

Figure 10:
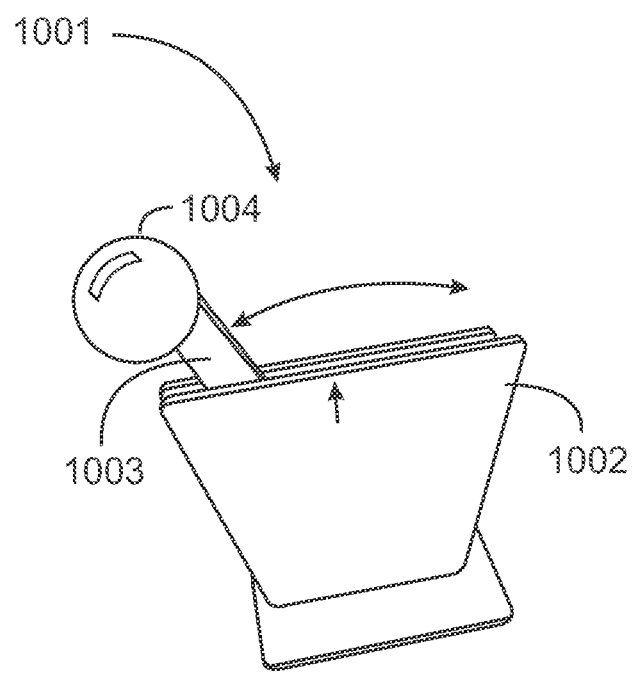
FIG. 10 illustrates a control lever for controlling power and direction to electric motors.

3. Reverse Thrust: On touchdown the DEPOD motors can be driven in the opposite direction, providing reverse thrust even before there is enough weight on the wheels for effective braking. Reverse thrust is common on airliners but almost never a consideration in DEP applications. Yet it is not overly complicated to reverse the direction of an electric motor. It is much simpler and significantly lighter and cheaper than the mechanism of a reversing propeller. FIG. 10 illustrates a control mechanism 1001 similar to a throttle controller for a gasoline-fed engine. A frame 1002 guides a lever 1003 topped by a ball 1004 for a user's hand grip. The lever is coupled to electrical control elements such that moving the lever forward from a center position marked by an arrow on the frame causes the electric motors to turn in a direction to provide forward thrust for the aircraft, and rpm increases with forward position of the lever. Moving the lever to the rear from the center position causes the motors to turn in a direction to provide reverse braking thrust, and again the rpm, hence the level of thrust, increases with movement away from the center position.

In the embodiment comprising the propellers associated only with the ailerons, it is just the propellers in the slots in the fixed wings that are controlled. In the embodiment also having propellers associated with the tail section, those propellers are also controlled. In another embodiment, separate control mechanisms may be provided for a user to control thrust from different propellers independently.

Significant Considerations:

The DEPOD system is used at full power for only 10-15 seconds on takeoff. And only at 20% power for up to 30 seconds on approach to landing, and 5 seconds or less on landing. This totals under one minute total running time. The battery packs are so small that they have minimal impact on payload and aircraft performance.

Figure 9:
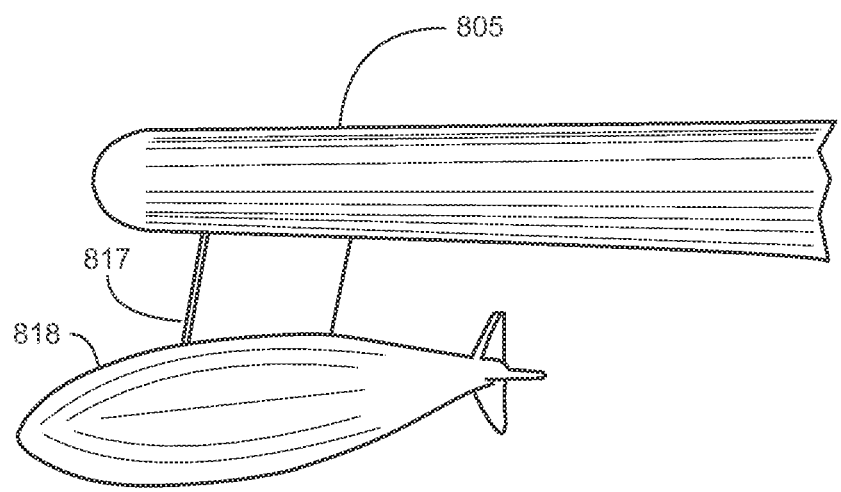
FIG. 9 illustrates a slipper pod for carrying batteries.

Batteries may be located in slipper pods with one under each wing near the electric motors. FIG. 9 illustrates a short section of wing 805 of aircraft 801 of FIG. 8A with a slipper pod 818 suspended from the wing by a standoff element 817. This arrangement reduces wing spar load and minimizes the length of heavy gauge battery cables. It also provides quick access for recharging or even a complete battery pod exchange. Furthermore, in the remote event of a battery fire the slipper pods are enabled to be jettisoned and may have a small parachute to reduce any risk to objects or people on the ground.

When not engaged, the two-blade propellers on each motor are fixed horizontally inside the wing so drag is eliminated. A unique magnet system secures the propellers horizontally. When the DEPOD is not engaged the aircraft flies normally without any significant loss of performance.

In the embodiment also utilizing DEPOD features in the tail section as illustrated in FIG. 8C, all of the advantages of the embodiment using only enhanced ailerons are realized, plus added control of the aircraft, plus still more takeoff thrust and reverse thrust on landing.

In yet another aspect of the invention, the innovation of embedding electrically driven propellers in the wings of an aircraft is leveraged to provide a further advantage. The fact of wing-tip vortex is well-known in the art and is caused by high pressure air spilling over the wing-tip into low pressure space above the wing, creating a vortex from each wing-tip that produces drag. Wing-tip vortex has been addressed in a number of ways in conventional art. One way is by implementing an upturned winglet at the wing-tip. In an embodiment of the present invention, wing-tip vortex is alleviated or eliminated by an additional electrically driven propeller.

Figure 11:
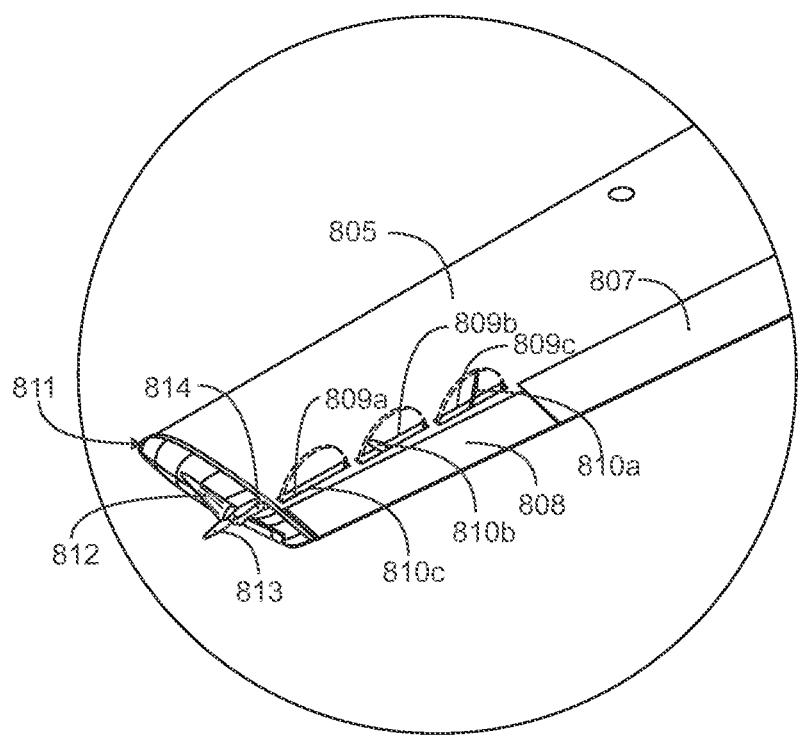
FIG. 11 illustrates an outboard propeller in another aspect of the invention.

FIG. 11 is a perspective view of an end of one wing of the STOL aircraft in an embodiment of the instant invention. This view is similar to that of FIG. 8B and includes the aileron 808 with proximate slots 809a, b and c, with propellers 810a, b and c, as in FIG. 8B. In the embodiment depicted in FIG. 11 the tip end of wing 805 is a structure 819 that has an angled portion 820 that has a drive shaft that turns a propeller 821 implemented in a slot 822. In this implementation the slot opens to the wing-tip and propeller 821 is positioned such that it turns through the slot as well as outside the slot, as may be seen in FIG. 11. The propeller turns opposite the direction of the vortex produced by the wing-tip, and effectively alleviates or eliminated the vortex, eliminating thereby the drag that the vortex produces. In one embodiment the rpm of the propeller may be controlled to increase with an increase in forward speed of the aircraft, therefore the forward speed of the wing-tip.

The skilled person will understand that in this embodiment of the invention, a mirror image of structure 819 on the end of the wing of the aircraft opposite wing 805 is provided to alleviate or eliminate the vortex produced by the tip of that opposite wing.

The skilled person will understand that the number of slots and propellers that may be provided in a flap system according to an embodiment of the present invention may vary considerably. The power of the brushless electric motors may differ in different embodiments as well. The nature, design and size of the propellers driven by the electric motors in the enhanced aileron and flap systems may vary as well. There are also other electric motors that may be used, rather than brushless motors.

Enhanced, Automated DEPOD

It is well known that individual aircraft may be characterized according to a "flight envelope" that describes capabilities of a design in terms of airspeed and load factor or atmospheric density. The flight envelope of an individual aircraft may be different from other aircraft of a same make and model if the individual aircraft has been modified in some way, like for example using a higher-octane fuel or having a supercharger installed. There are many such variations that might be made. This is true for aircraft that meet the features of STOL aircraft in embodiments of the present invention, that is, aircraft that incorporate a primary propulsion system and additionally strategically placed propellers that are proximate ailerons, flaps or rudders, and may be operated to enhance control of roll, lift or rudder effects. A variety of distributed electrically driven propellers for such purposes are described in detail above with reference to drawing figures associated with this specification.

In an embodiment of the invention sensors 507 as indicated in FIG. 5 represent a plurality of sensors that report important real-time data to CPU 502 for use in control functions. One of the more important data points is airspeed. One or more airspeed sensors are implemented on a surface of the aircraft to report real-time airspeed. Other sensors determine attitude of the aircraft, including roll attitude and attitude of the fuselage, such as pitch and yaw. There may be other sensors involved as well. In processes in embodiments of the present invention CPU 502 executes one or more code sequences from data repository 503, and commands physical elements for control of the aircraft according to data provided by sensors.

CPU 502 may be one of many well-known digital processors in the art or may be a micro-processor in some embodiments. CPU 502 executes software (SW) 504 in this example and is coupled to a data repository 503 which may store one or more code sequences that may be called and executed in different circumstances in control and may also store data values that are called in control sequences. Specific uses of DEPOD are described above specifically for exceptionally short takeoff and landing roll.

In an embodiment of the invention utilizing enhanced DEPOD a program is executed in background as long as the aircraft is in motion, sensors 507 are continuously monitored during program execution, and status is continuously compared to preprogrammed values that indicate the aircraft is operating within its specific flight envelope.

Figure 12:
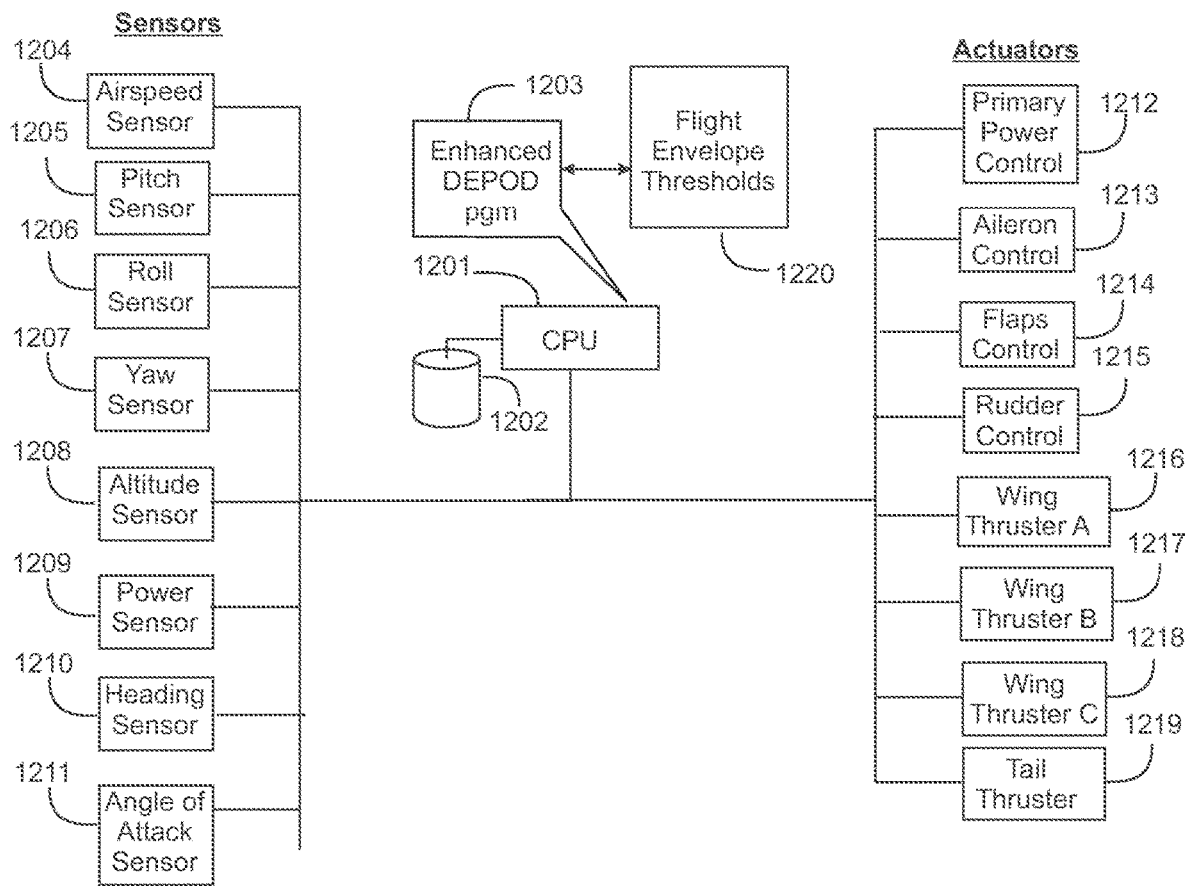
FIG. 12 illustrates an automated control system in an embodiment of the invention.

FIG. 12 is a diagram illustrating operation of a program and sensors to maintain an aircraft within its unique flight envelope. In this diagram CPU 1201 may be analogous to CPU 502 of FIG. 5. CPU 1201 is coupled to a data repository 1202 which may store data regarding a flight envelope for the specific aircraft in which CPU 1201 is active, and programs that CPU 1201 may execute, as well as other software and data. CPU 1201 is coupled to sensors 1204-1211 which report values for a variety of flight characteristics of the aircraft in real time. CPU 1201 is also coupled to actuators 1212-1219 and may operate these actuators to change flight characteristics of the aircraft. For example, CPU 1201 may control primary power to increase or decrease primary thrust. CPU 1201 may also vary thrust on wing thrusters, and may control flaps, ailerons and the rudder of the aircraft. Further, CPU 1201, through program 1203, has access to a preprogrammed set of data 1220 that defines the flight envelope for the particular aircraft.

It should be understood that the flight envelope data does not simply store a set of constants and variables, but also a set of combined conditions that define a boundary for safe operation of the aircraft. Within the boundary the aircraft may be said to be operating within the flight envelope. Outside the boundaries remedial action is urgently needed to restore the aircraft to operation within the flight envelope. For example there may be a set of conditions involving altitude, airspeed, and pitch, which indicate a threshold between safe and unsafe operation. In this set, if any one of the three conditions should fall below a threshold constant, the aircraft may be judged outside the flight envelope. And, considering the values for each of the three conditions in the set, specific action may be indicated. The boundaries of the flight envelope are defined by sets of conditions labeled flight envelope thresholds 1220.

Figure 13:
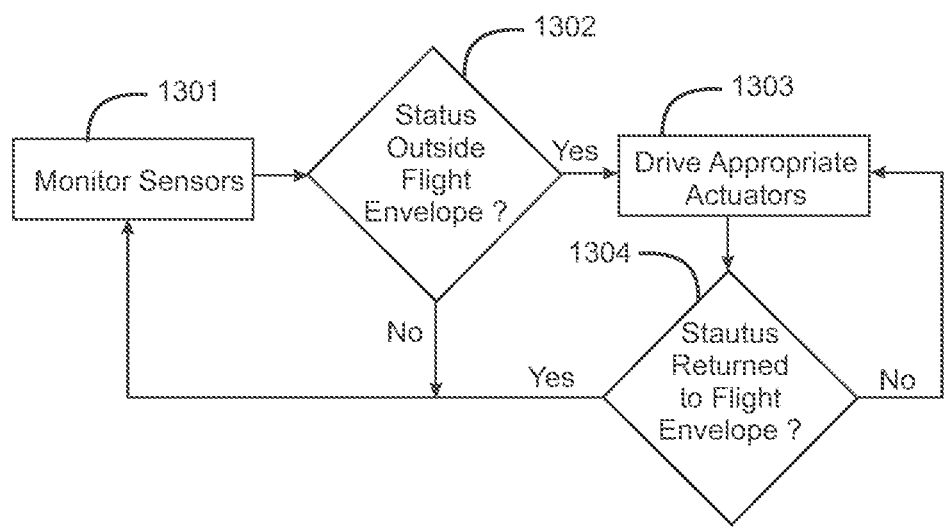
FIG. 13 is a flow diagram illustrating operation of the control system of FIG. 12.

CPU 102, while the aircraft is in operation, executes a program 1203 labeled Enhanced DEPOD program. FIG. 13 is a flow diagram illustrating how the system works in one embodiment of the invention. At 301 all the sensors are monitored in real time while the aircraft is in operation. At 1302 the system determines whether the aircraft is operating within or outside the flight envelope. If within (No), control goes back to step 1301, until step 1302 discovers that the aircraft flight characteristics are outside one or more of the stored sets of thresholds 1220 (Yes). If Yes, the system drives appropriate actuators at step 103 until step 1304 indicates that status has retuned to the flight envelope.

The system of the invention described herein with reference to FIGS. 12 and 13 as applicable to a fixed wing aircraft may be applicable as well to VTOL aircraft, such as helicopters, and to all sorts of aircraft.

The person of ordinary skill in the art will understand that there may be many sets of thresholds that will indicate a danger and necessitate immediate action, and programmed actuation to solve different sets of dangerous conditions might be numerous.

The skilled person will understand still further that the elements described in enabling detail in embodiments and implementations above may be combined in a variety of ways in different variations of the invention, all within the scope of the invention. The scope of the invention is limited only by the scope of the claims.

The invention claimed is:
1. A fixed wing aircraft having a pilot compartment and an engine, comprising:
apparatus adapted to control flight attitude, and direction including at least a first reversible electric motor implemented in a first fixed wing driving a first two-blade propeller in a first slot and a second reversible electric motor implemented in a second fixed wing driving a second two-blade propeller in a second slot, the first and second two-blade propellers are adapted to be constrained wholly within the first and second slots when not being driven by their associated electric motor;
a controller adapted to vary power of the engine;
sensors sensing at least altitude, airspeed, power level, and aircraft attitude;
a CPU coupled to a data repository, to the sensors and to actuators adapted to change the flight attitude and direction and to vary power at the engine; and
safe flight envelope data and conditions stored in the data repository defining flight conditions at boundaries of safe and unsafe operation;
characterized in that the first and second slots are positioned, one each, proximate a wing tip on the first and second fixed wings and include a length oriented parallel with the first and second fixed wings, the CPU monitors the sensors while the aircraft is in operation, determines if flight status is outside the safe flight envelope, and if so, drives appropriate actuators to manipulate the apparatus adapted to control flight attitude and direction and/or the controller adapted to vary power of the engine including at least the first and second electric motors driving the first and second two-blade propellers in a programmed manner until the flight status is within the safe flight envelope.
2. The aircraft of claim 1 wherein the aircraft is Vertical Take Off and Landing (VTOL) aircraft.

3. The aircraft of claim 1 wherein the apparatus adapted to control flight attitude, direction also comprises ailerons, flaps, and a rudder.

4. The aircraft of claim 3 wherein the aircraft further comprises distributed electrically driven, individually controllable additional propellers proximate one or more of ailerons, flaps or rudders, the additional propellers powered by one or more on-board batteries.

5. The aircraft of claim 3 wherein the aircraft is a Short Takeoff and Landing (STOL) aircraft having a fuselage with a long axis and a primary engine providing controllable primary forward thrust to propel the aircraft, further comprising a first aileron implemented proximate an end of the first fixed wing extending from the fuselage, a second aileron implemented proximate an end of the second fixed wing, opposite the first fixed wing, the first slot having the length and a width through the first fixed wing proximate the first aileron, the slot length substantially orthogonal to the axis of the fuselage, the second slot having the length and a width through the second fixed wing proximate the second aileron, the slot length substantially orthogonal to the axis of the fuselage, and a control mechanism accessible to a user in a cockpit of the aircraft, the control mechanism enabling the user to drive the first and second electric motors in a same rotary direction, to reverse the rotary direction, and to drive the first and second electric motors at a same rpm in either rotary direction.

6. The STOL aircraft of claim 5, further comprising a plurality of slots in linear arrangement along an edge of each aileron, each slot enclosing a two-blade propeller driven by a reversible electric motor, wherein all of the propellers are driven in concert.

7. The STOL aircraft of claim 5 further comprising bays implemented in the wings, the bays housing batteries interconnected and coupled to the first and second electric motors.

8. The STOL aircraft of claim 5 further comprising slipper pods slung under the first and second wings, the first and second wings and the slipper pods housing batteries interconnected and coupled to the first and second electric motors.

9. The STOL aircraft of claim 8 wherein the slipper pods are adapted to be jettisoned on command.

10. A method to maintain operation of an aircraft having a pilot compartment and an engine within a safe flight envelope, comprising: monitoring sensors sensing at least altitude, airspeed, power level, and aircraft attitude by a CPU coupled to a data repository, to the sensors and to actuators adapted to control apparatus adapted to control flight attitude and direction to change the flight attitude and direction and to vary power at the engine, the apparatus including at least a first slot having a length and a width through the first fixed wing and a second slot having a length and a width through the second fixed wing, a first reversible electric motor implemented in the first fixed wing driving a first two-blade propeller in the first slot, and a second reversible electric motor implemented in the second fixed wing driving a second two-blade propeller in the second slot and constraining the two-blade propeller in each slot is adapted to be constrained wholly within the slot when not being driven by the associated electric motor;
  determining whether flight status is outside a safe flight envelope by comparison of real time sensed values to stored safe flight envelope data and conditions in the data repository defining flight conditions at boundaries of safe and unsafe operation;
  if so, driving appropriate actuators to manipulate the apparatus adapted to control flight attitude and direction and/or the controller adapted to vary power of the engine including at least the first and second electric motors driving the first and second two-blade propellers in a programmed manner until the flight status is within the safe flight envelope.

11. Performing the method of claim 10 with a Vertical Take Off and Landing (VTOL) aircraft.

12. Performing the method of claim 10 with a fixed wing aircraft having ailerons, flaps, and a rudder.

13. Performing the method of claim 12 with an aircraft further comprising distributed electrically driven, individually controllable additional propellers proximate one or more of ailerons, flaps or rudders, the motors powered by one or more on-board batteries.

14. Performing the method of claim 12 with a Short Takeoff and Landing (STOL) aircraft having a fuselage with a long axis and a primary engine providing controllable primary forward thrust to propel the aircraft, further comprising a first aileron implemented proximate an end of a first fixed wing extending from the fuselage, a second aileron implemented proximate an end of a second fixed wing, opposite the first fixed wing, the first slot having a length and a width through the first fixed wing proximate the first aileron, the slot length substantially orthogonal to the axis of the fuselage, the second slot having a length and a width through the second fixed wing proximate the second aileron, the slot length substantially orthogonal to the axis of the fuselage, and a control mechanism accessible to a user in a cockpit of the aircraft, the control mechanism enabling the user to drive the first and second electric motors in a same rotary direction, to reverse the rotary direction, and to drive the first and second electric motors at a same rpm in either rotary direction.

15. Performing the method of claim 14 with the STOL aircraft further comprising a plurality of slots in linear arrangement along an edge of each aileron, each slot enclosing a two-blade propeller driven by a reversible electric motor, wherein all of the propellers are driven in concert.

16. Performing the method of claim 12 with the STOL aircraft further comprising bays implemented in the wings, the bays housing batteries interconnected and coupled to the electric motors.

17. Performing the method of claim 14 with the STOL aircraft further comprising slipper pods slung under the wings, the wings and the slipper pods housing batteries interconnected and coupled to the first and second electric motors.

18. Performing the method of claim 17 wherein the slipper pods are adapted to be jettisoned on command.

* * * * *